United States Patent Office 2,873,644
Patented Feb. 17, 1959

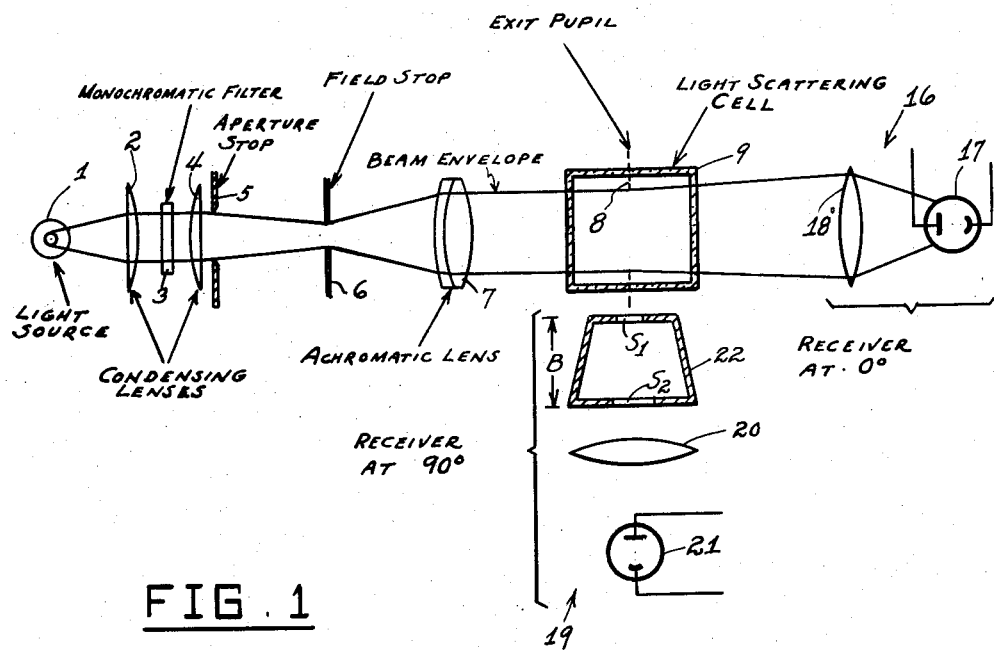

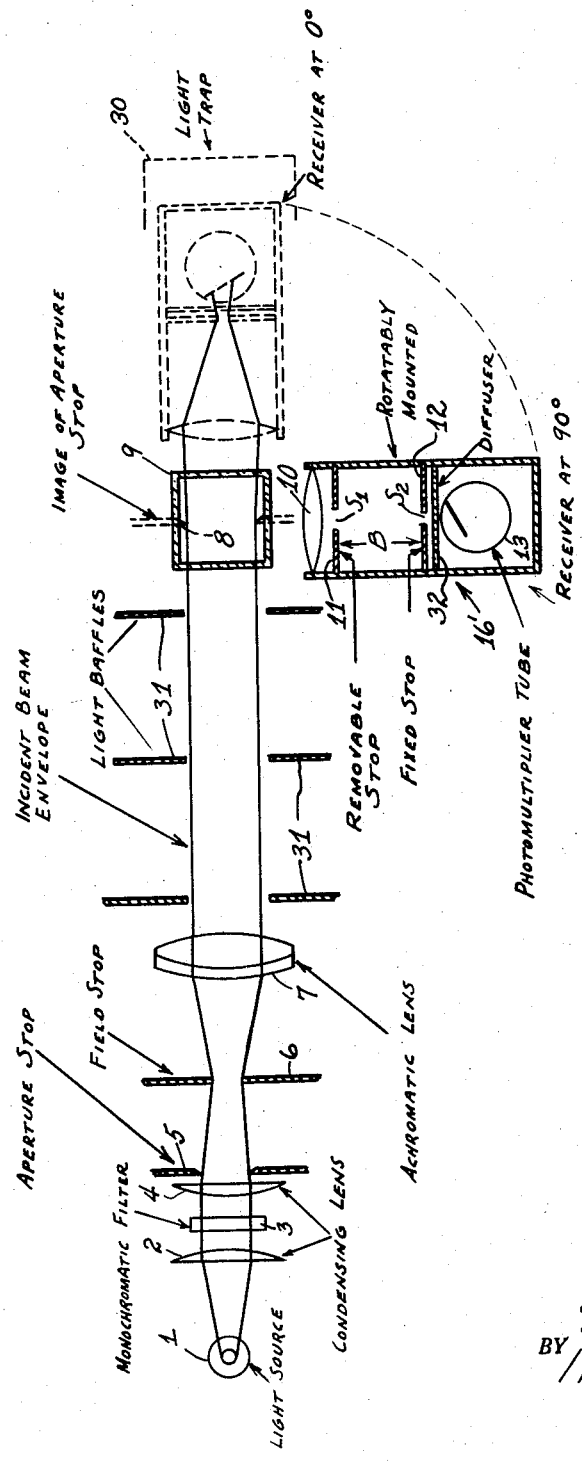

2,873,644

OPTICAL SYSTEM FOR THE MEASUREMENT OF TURBIDITY

Jerome Kremen and Justin J. Shapiro, Silver Spring, Md., assignors to American Instrument Co., Inc., Silver Spring, Md.

Application February 8, 1955, Serial No. 486,957

5 Claims. (Cl. 88—14)

This invention relates to an optical system for the absolute determination of turbidity of liquids (and solids) and more particularly to a system for the measurement of very low turbidities where the turbidity must be determined from the intensity of the light scattered from the material and where a photoelectric device is used to measure the light intensity.

In turbidimeters of this type a beam of light is passed through the material and the turbidity of the material is determined from the ratio of the radiant intensity of the light scattered at 90° from the beam to the irradiance of the beam at the sample, this ratio being called Rayleigh's ratio.

In visual instruments which perform this measurement, Rayleigh's ratio is determined from the ratio of the brightness of the illuminated portion of the sample to the brightness of a diffuser placed in the incident beam. In photo-electric instruments no such simple solution is possible, because the photo tube measures the total flux incident on the photo cathode.

At least two absolute Rayleigh turbidimeters employing photo-sensitive tubes have been described previously: See Brice J. O. S. A., vol. 40, pages 768–778, November 1950, and Kushner, J. O. S. A., vol. 44, pages 155–159, February 1954.

A main object of this invention is to provide a Rayleigh turbidimeter whereby the difficult and uncertain procedures heretofore required with previously known turbidimeters are eliminated and Rayleigh's ratio, expressing the turbidity of the sample, is determined by an expression containing fixed, easily measured dimensions.

A further object of the invention is to provide a Rayleigh turbidimeter of increased accuracy, accomplished by the use of a beam of uniform irradiance at the sample, in conjunction with a receiver design in which the flux received at zero degrees and at ninety degrees determines respectively the radiant intensity and irradiance in an exact and readily calculable manner.

"Radiant intensity" of an extended volume source is defined as the radiant flux emitted per unit solid angle per unit volume of the source. "Irradiance" is defined as the radiant flux per unit surface area incident upon a surface.

A still further object of the invention is to provide a Rayleigh turbidimeter which may be simply and easily aligned by the user, and in which the alignment is not critical.

Further objects and advantages of the invention will become apparent from the following description and claims, and from the accompanying drawings, wherein:

Figure 1 is a diagrammatic view illustrating one form of optical system employed in a turbidimeter according to the present invention.

Figure 2 is a diagrammatic view illustrating another form of optical system as employed in a turbidimeter according to this invention.

Rayleigh turbidimeters require an incident beam of approximately parallel light. It is usually assumed that this can be achieved only by collimation, i. e., with the source image at infinity. However, if the source is extended, as is usually the case, equally good parallelism can be obtained with focussed systems, thereby eliminating vignetting with the resultant non-uniform irradiance at the sample. In the turbidimeters described below, an image of the aperture stop of the system is focussed in the cell and a high degree of parallelism of light is obtained by maintaining the distance between the image of the aperture stop and the virtual image (not shown) of the field stop large as compared to the transverse dimensions of these stop images.

Referring to the drawings, and more particularly to Figure 1, 1 designates a mercury vapor lamp which, when used with proper filters, serves as an intense source of monochromatic light. The light flux from the lamp passes through a set of condensing lenses 2 and 4, between which is placed a monochromatic filter 3 to select the desired wave length of light. An aperture stop 5 limits the solid angle of light coming from the source 1. The irradiance of the light beam is uniform across the plane of the aperture stop 5. An image of the source 1 is focussed on the field stop 6 located between the achromatic lens 7 and its focal point. The achromatic lens 7 forms an image 8 of the aperture stop 5 in the center of the transparent cell 9. Because the irradiance of the beam is uniform in the plane of the aperture stop 5, it is also uniform in the plane of its image 8.

A first receiver 16 measures the radiant flux at zero degrees and another receiver 19 measures the radiant flux at 90 degrees. As will be pointed out in connection with Figure 2, a single swivelly mounted receiver may be employed which may be positioned either at zero degrees or 90 degrees.

The receiver in the zero degree position, namely, the receiver 16 in Figure 1, comprises a photo-electric response means 17, such as a photomultiplier tube, and a lens 18 adjusted to focus the emergent flux on the photosensitive element of the response means. The receiver in the 90 degree position, namely, the receiver 19 in Figure 1, comprises the focussing lens 20 and the photoelectric flux-measuring means 21 arranged on the 90 degree axis in the plane of the aperture stop image 8.

Designated at 22 is a nosepiece having the spaced stops $S_1$ and $S_2$ separated by a distance B, the nosepiece 22 being located between cell 9 and lens 20 on the 90 degree axis in the plane of image 8.

In accordance with an equation derived by Hermans and Levinson (J. O. S. A., vol. 41, p. 460, 1951) the flux $F_{90}$ from a beam passing through a sample solution accepted by a receiver at 90 degrees to the beam and consisting of two stops of areas $S_1$ and $S_2$ separated by a distance B, is $$F_{90}=\frac{j_{90}S_1S_2h}{n^2B^2} \quad (1)$$

where $j_{90}$ is the radiant intensity of light scattered at 90 degrees per unit volume of sample solution, $n$ is the refractive index of the solution, and $h$ is the width of the beam. This equation is valid provided that the distance between the stops is large compared to their transverse dimensions and that the field viewed at the beam by the receiver is within the beam. It is the simplest expression obtainable practically for the light received at 90 degrees.

The receiver 19 at 90 degrees fulfills the conditions required by Equation 1, which now gives the flux received in this position. At the zero degree receiver 16 the entire flux of the incident beam falls on the photo tube 17. The flux $F_0$ received in this position is $$F_0=i_0vh \quad (2)$$

where $i_0$ is the irradiance of the incident beam at the sample, $v$ is the height of the aperture image 8, and $h$ is the width of said aperture image.

Solving Equations 1 and 2 for Rayleigh's ratio $$R_{90} = \frac{j_{90}}{i_0};$$

$$R_{90} = \frac{j_{90}}{i_0} = \frac{vn^2 B^2}{S_1 S_2}\left(\frac{F_{90}}{F_0}\right) \quad (3)$$

The dimensions in this expression, namely, area of the receiver stops, distance between receiver stops, and height of the aperture image, are easily fixed or measured. Only one alignment is required, namely, focussing the image 8 of the aperture stop on the center of the cell 17 or 21. (Lenses 18 and 20, and cells 17 and 21 are located on arcs concentric with the intersection of the zero axis with the plane of image 8. As above explained, the receiver may be mounted on a rotatable carriage pivoted to rotate on an axis including this intersection, suitable provision being made to remove the nosepiece 22 when the receiver is at the zero degree position.)

In Figure 2, a receiver 16' which is rotatable around an axis through the center of the cell 9 measures the radiant flux at 90 degrees and at zero degrees. The receiver 16' consists of a simple lens 10, a removable stop 11, a fixed stop 12, and a photomultiplier tube 13. The movable stop 11 may be releasably held in either of two positions by suitable detent means. In its first position it is centered on the receiver axis. In its second position it is shifted above the receiver axis so as not to intercept any portion of the incident beam when the receiver is at zero degrees. The photomultiplier tube 13 is coupled to a D. C. power supply and current amplifier, not shown. Diagrammatically shown at 30 is a light trap which functions to absorb the light of the incident beam and to prevent the reflected light from entering the receiver, and diagrammatically shown at 31 are spaced baffles arranged to prevent light scattered from the achromatic lens from entering the receiver. A diffuser 32 is employed in front of the photomultiplier tube.

When the receiver is in the 90 degree position, the stop 11 is placed in the position wherein it is centered on the receiver axis. The flux received in this position is given by Equation 1 above stated.

When the receiver is rotated to zero degrees, stop 11 is shifted to its second position, out of the incident beam. An image of the field stop 6, smaller than the aperture of receiver stop 12 is focussed approximately in the plane of stop 12 and the entire flux of the incident beam strikes the diffuser 32. (In practice, a high density neutral filter of accurately known transmittance is inserted to reduce the intensity of the flux on the photomultiplier tube, but for the sake of simplicity this is not shown). Since the irradiance of the beam is uniform, the flux received in this position is given by Equation 2 above, $i_0$ being, as in the case of Figure 1, the irradiance of the incident beam in the plane of the image 8 of the aperture stop 5.

The value of Rayleigh's ratio $R_{90}$ is found from Equation 3, as in the case of Figure 1.

The above optical system was tested by measuring Rayleigh's ratio for benzene at a wavelength of 436 millimicrons. The benzene was prepared by double distillation and filtration directly into the square turbidity cell 9. One face of the cell was blackened and a 5% correction was applied for reflection at the back face of the cell.

A value of $R_{90} = 46.3 \times 10^{-6}$ cm.$^{-1}$ for benzene at 436 millimicrons was obtained. This is within the experimental error of 5% of previous values given in the literature.

While certain specific embodiments of an improved Rayleigh turbidimeter have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a turbidity measuring apparatus, a transparent vessel adapted to contain material to be tested having light scattering properties, a light source, an aperture stop located between said source and said vessel, means providing uniform irradiance in the light beam across the plane of said aperture stop, a field stop between the aperture stop and the vessel, means focussing an image of the source on the field stop, a lens between the field stop and the vessel, said field stop being located between the lens and its focal point, said lens being formed and arranged to form an image of the aperture stop of uniform irradiance in the intermediate portion of the vessel, and flux-measuring means formed and arranged to receive the direct flux of said beam, said flux-measuring means being further formed and arranged to receive light flux scattered by the material along an axis extending from the intermediate portion of the vessel normal to the beam and including a pair of spaced parallel stop windows on said last-named axis between the flux-measuring means and said vessel, the distance between the stop windows being large compared to their transverse dimensions and the stop windows being smaller than the transverse area of the scattered light beam, at least one of the stop windows being removable to measure said direct flux.

2. In a turbidity measuring apparatus, a transparent vessel adapted to contain material to be tested having light scattering properties, a light source, an aperture stop located between said source and said vessel, means providing uniform irradiance in the light beam across the plane of said aperture stop, a field stop between the aperture stop and the vessel, means focussing an image of the source on the field stop, a lens between the field stop and the vessel, said field stop being located between the lens and its focal point, said lens being formed and arranged to form an image of the aperture stop of uniform irradiance in the intermediate portion of the vessel, first flux-measuring means aligned with and formed and arranged to receive the direct flux of said beam, second flux-measuring means arranged on an axis extending from the intermediate portion of the vessel normal to the beam and located to receive light flux scattered by the material, and a pair of spaced parallel stop windows arranged on said last-named axis between said second flux-measuring means and said vessel.

3. The structure of claim 2, and wherein each of said flux-measuring means includes a focussing lens and a photo-sensitive flux-responsive device located substantially at the focus of the lens.

4. The structure of claim 3, and wherein the focussing lenses are substantially at the same radial distance from the vessel.

5. The structure of claim 3, and wherein the focussing lenses are substantially at the same radial distance from the intersection of the axis of said beam with the central transverse plane of said vessel.

References Cited in the file of this patent

UNITED STATES PATENTS 2,045,124    Cummins et al. _____ June 23, 1936

FOREIGN PATENTS 688,653    Great Britain _____ Mar. 11, 1953

OTHER REFERENCES

"Photoelectric Light-Scattering Photometer for Determining High Molecular Weights," Brice et al., Journal of the Optical Society of America, vol. 40, November 1950, pages 768–778 cited.